United States Patent [19]

Ort

[11] Patent Number: 5,136,626
[45] Date of Patent: Aug. 4, 1992

[54] METHOD FOR IDENTIFYING X-RAY FILM WITH PATIENT INFORMATION DISPLAYED OUTSIDE A CASSETTE

[75] Inventor: Wolfgang Ort, Stuttgart, Fed. Rep. of Germany

[73] Assignee: Eastman Kodak Company, Rochester, N.Y.

[21] Appl. No.: 651,711

[22] Filed: Feb. 6, 1991

[30] Foreign Application Priority Data

Feb. 20, 1990 [DE] Fed. Rep. of Germany ....... 4005218

[51] Int. Cl.$^5$ ............................................. H05G 1/28
[52] U.S. Cl. ...................... 378/165; 378/162; 378/182
[58] Field of Search ............... 378/165, 166, 182, 210, 378/188, 185, 162

[56] References Cited

U.S. PATENT DOCUMENTS

| | | | |
|---|---|---|---|
| 3,221,620 | 12/1965 | Sano et al. | 95/1.1 |
| 3,488,753 | 1/1970 | Tone et al. | 250/67 |
| 3,631,243 | 12/1971 | Byler et al. | 378/166 |
| 3,655,972 | 4/1972 | Somerset | 378/182 |
| 3,675,014 | 7/1972 | Perl | 378/98 |
| 3,683,182 | 8/1972 | Farmer | 378/166 |
| 3,836,783 | 9/1974 | Stievenart et al. | 378/188 |
| 3,845,314 | 10/1974 | Byler et al. | 378/166 |
| 3,888,587 | 6/1975 | Perl | 355/112 |
| 3,959,657 | 5/1976 | Katz et al. | 378/166 |
| 3,964,107 | 6/1976 | Stievenart et al. | 378/166 |
| 3,973,130 | 8/1976 | Amemiya | 378/166 |
| 3,979,025 | 3/1974 | Murphy, Jr. et al. | 354/77 |
| 4,001,592 | 1/1977 | Katz et al. | 378/166 |
| 4,139,273 | 2/1979 | Crossland et al. | 350/340 |
| 4,250,389 | 2/1981 | Brendl et al. | 378/166 |
| 4,310,858 | 1/1982 | Hareng et al. | 358/302 |
| 4,383,329 | 5/1983 | Kröbel et al. | 378/166 |
| 4,507,797 | 3/1985 | Kato | 378/165 |
| 4,739,480 | 4/1988 | Oono et al. | 364/413 |
| 4,860,330 | 8/1989 | Strömmer et al. | 378/165 |
| 4,903,288 | 2/1990 | McAllister | 378/162 |
| 4,960,994 | 10/1990 | Müller et al. | 250/327.2 |

FOREIGN PATENT DOCUMENTS

| | | | |
|---|---|---|---|
| 63-80246 | 4/1988 | Japan | 378/162 |
| 1-270045 | 10/1989 | Japan | 378/162 |
| 1355854 | 6/1974 | United Kingdom | 378/166 |

Primary Examiner—Janice A. Howell
Assistant Examiner—Kim-Kwok Chu
Attorney, Agent, or Firm—G. Herman Childress

[57] ABSTRACT

A sheet of x-ray film in a film cassette is identified with patient data by first providing such data to a data carrier, such as an LCD unit, mounted on the cassette and facing away from the cassette. Then the film that is removed from the cassette in a light-tight environment and exposed to the patient data in the data carrier.

5 Claims, 1 Drawing Sheet

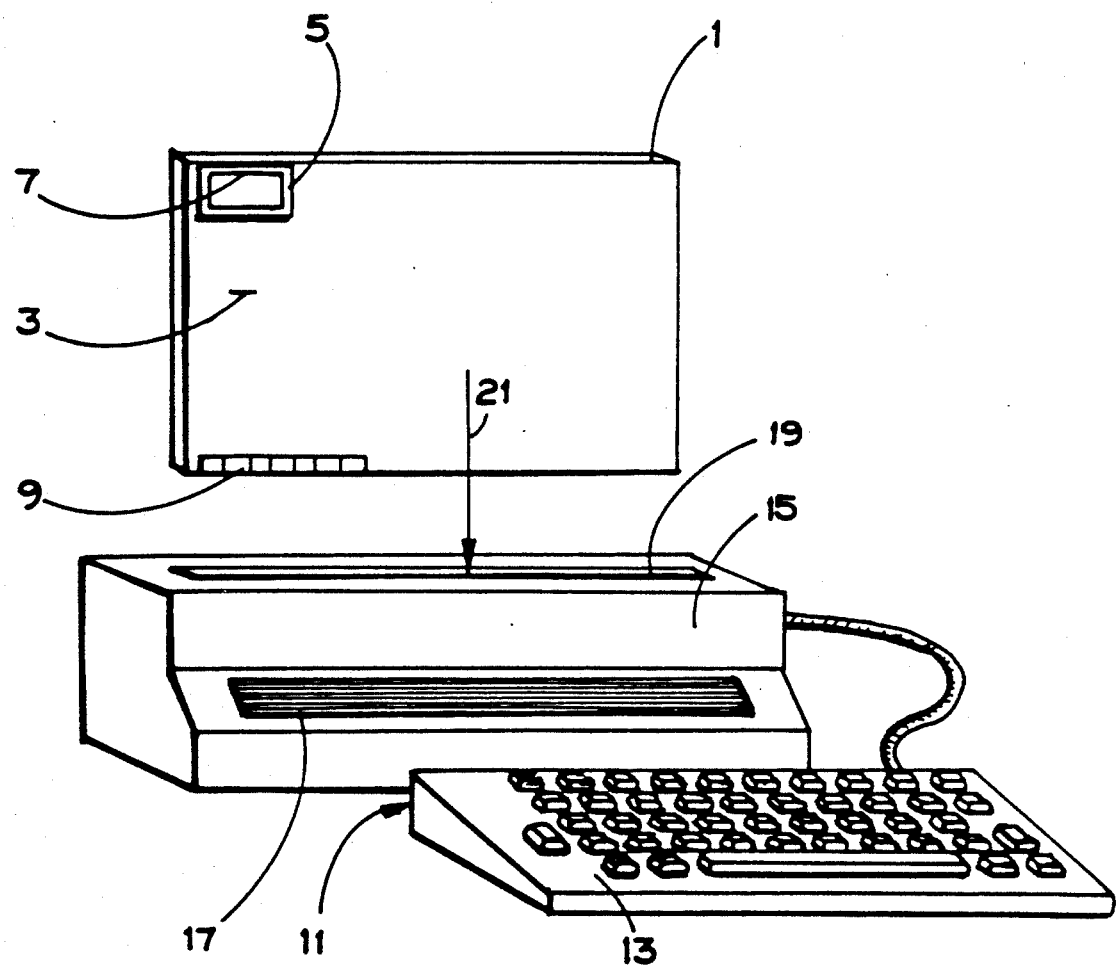

METHOD FOR IDENTIFYING X-RAY FILM WITH PATIENT INFORMATION DISPLAYED OUTSIDE A CASSETTE

BACKGROUND OF THE INVENTION

The invention relates to a method and apparatus for identifying X-ray film with patient data by use of an X-ray film cassette and a patient data carrier associated with said cassette, and wherein the X-ray film is exposed to a pattern representing the data of the data carrier.

U.S. Pat. No. 4,383,329 discloses apparatus which includes an X-ray film cassette having a window which can be closed in a light-tight manner, or opened, as known from a commercially available cassette. In such apparatus, an identifying exposure of a film sheet is carried out by means of a projection unit through the open cassette window. However, the film may be incorrectly identified if the wrong data carrier is erroneously supplied to the projection unit or if the operator erroneously inserts into the projection unit an incorrect film cassette which does not belong to the data carrier located in the projection unit.

SUMMARY OF THE INVENTION

It is an object of the invention to provide an identification method which offers a high degree of protection against incorrect identification.

In accordance with the invention, this object is attained by a data carrier that is an LCD-unit with memory characteristics, and which is provided on the cassette, so that the data are machine-read from the data carrier and converted into control signals by means of which the identification exposure of the X-ray film is controlled.

By using a cassette which contains the data carrier as an integral component, the invention prevents the data carrier and the cassette from being incorrectly associated. Moreover, because the data carrier used is an LCD-unit addressable from the exterior of the cassette, the invention avoids a further possible source of error, i.e., it avoids the possibility that a set of data is read into the data carrier which is not adapted for the cassette. This possible error is avoided by the present invention because the patient data can be read into the LCD-unit directly during actual use due to exterior control contacts of the cassette being addressed for reading of the data while the cassette is positioned in an X-ray apparatus for the radiographic exposure of a part of the body of the patient. For this purpose the X-ray or radiographic apparatus may have on its cassette chamber a contacting means which cooperates with the control contacts of the cassette.

Depending on the organization of a hospital or doctor's office, data can be read into the LCD-unit in different ways. If the patient data are, e.g. stored in a computer system of the hospital, the data can be retrieved from a computer terminal when an X-ray exposure is made and read into the film cassette placed in the X-ray apparatus. If, on the other hand, each patient has a patient ID card, a card reader can be provided in connection with the X-ray apparatus. The Patient's ID card is inserted into the card read which reads the set of data into the LCD-unit of the cassette, for example, by reading out a magnetic strip or the like on said ID card. The control can be such that the X-ray exposure can be actuated only after, or only simultaneously with, the reading in of the set of data.

BRIEF DESCRIPTION OF THE DRAWING

In the detailed description of the preferred embodiments of the invention presented below, reference is made to the single figure of the accompanying drawing, which is a perspective schematically simplified view of an X-ray film cassette comprising a data carrier as well as a means for reading patient data into said data carrier of the cassette.

DETAILED DESCRIPTION OF THE PREFERRED EMBODIMENTS

Disregarding the special type and arrangement of the associated data carrier, an X-ray film cassette 1 is designed generally in the way typical of such cassettes. It has a cassette housing which can be opened and closed and in the interior of which an X-ray film, possibly with intensifying screens, can be accommodated in a light-tight manner. In one corner of the outer wall of the housing of cassette 1, a data carrier in the form of an LCD-unit 5 is located on the outer surface of wall 3 such that its rectangular display 7 faces away from wall 3 and is visible from the exterior of the cassette without an opening being provided in the wall 3. The LCD-unit 5 is of a known kind having memory characteristics. Such characteristics are exhibited by an LCD-unit of the SMECTIC A type, and can be used in the present invention.

In the case of such an LCD-unit, a crystal orientation caused by electric addressing is maintained even after the control voltage has been switched off. The information read in and stored due to the unchanged crystal orientation is erased when the unit is again electrically addressed by a voltage of opposite polarity. LCD-unit 5 has a number of control contacts 9 which are positioned along an edge of the outer wall 3 of the cassette 1 where they re readily accessible and can be contacted from the exterior of the cassette. Contacts 9 allows the LCD-unit 5 to be address and data to be read into it with the data appearing in the rectangular display 7, and the contacts also allow the data that is read in to be erased. The control contacts 9 are associated with a suitable display matrix of display 7 which e.g. allows the data to be alphanumerically represented by means of a seven segment display or a dot matrix.

Due to the memory characteristics of the LCD-unit 5, no power supply (battery) is required for the LCD-unit 5, or in cassette 1 because, as was mentioned before, the data read are maintained in the display 7 after the LCD-unit has been addressed via the control contacts 9, until it is again addressed via the control contacts 9 with an erasing voltage.

A data processing unit generally denoted 11 comprises a data input keyboard 13 of a known type as well as a read-in unit 15. The unit 15 includes a temporary data storage means as commonly used in data processing units, the data storage means being adapted to receive a plurality of lines of data. Unit 15 also has an LED display field 17 in which the data of the temporary storage means are visible. Moreover the unit 15 has a slot 19 into which cassette 1 can be inserted, as shown by an arrow 21. When the cassette is inserted in unit 15, the control contacts 9 are brought into contact with complementary contacts (not shown) of unit 15. this enables the LCD-unit 5 to be addressed from unit 15. The data entered into unit 15 and visible in the display field 17 are read into the LCD-unit 5 by means of a control device (controller), which is located in unit 15 and adapted for the LCD-unit 5, so that the data are visible in display 7. The data remain visible even after cassette 1 has been withdrawn from slot 19.

After cassette 1 has been radiographically exposed in an X-ray apparatus for the medical purpose desired, cassette 1 is transferred in the usual manner to an unloading and loading apparatus. In the light-tight inner space of such apparatus, cassette 1 is opened for unloading of the exposed X-ray film, and the exposed X-ray film is delivered to a processor unit for development. Then another X-ray film is inserted into the cassette before the cassette is closed again and dispensed from the unloading and loading apparatus for another use. An example of such apparatus, which are also known as multiloaders, is commercially available from the Eastman Kodak Company, Rochester, N.Y., under the name "Multiloader 700".

The unloading and loading apparatus differs from the commonly used multiloaders (such as the "Multiloader 700") in that it includes the following additional means:

a) a scanner unit serving as a data-reading apparatus,
b) an exposure station, and
c) an erasing station.

The data-reading apparatus for the unloading and loading apparatus can be a conventional type of scanner by which the data in the display 7 of the LCD-unit 5 can be read out and converted into electric control signals. The scanner may be arranged at the insertion slot of the unloading and loading apparatus such that the display 7 is scanned when cassette 1 moves into the unloading and loading apparatus.

The exposure station of the unloading and loading apparatus preferably comprises an LED-writing unit controllable by the control signals of the scanner for imagewise exposure of the X-ray film. The writing unit is preferably associated with the cassette-opening mechanism provided in the unloading and loading apparatus and, after opening of the cassette, temporarily contacts the X-ray film for exposure.

The erasing station of the unloading and loading apparatus is arranged such that cassette 1, before being loaded with another X-ray film and dispensed from the unloading and loading apparatus, is placed with its control contacts 9 into contact with erasing contacts of the erasing station so that the data in display 7 of the LCD-unit 5 are erased.

Sometimes patient data is filed in a central computer in a hospital. If so, unit 15 can be connected directly to a computer terminal for receiving such data from the computer instead of from a keyboard 13. Also, each patient may be provided with an identification card having machine readable data, such as a magnetic stripe. If such a card is provided then keyboard 13 can be replaced with a card reading unit into which the patient's card is inserted for reading prior to X-ray exposure.

The unit 15 can be integrated into the X-ray apparatus, i.e., associated with the cassette-holding mechanism of an X-ray apparatus so that the reading of patient data into the LCD-unit 5 can take place directly during the X-ray treatment.

The invention has been described in detail with particular reference to preferred embodiments thereof, but will be understood that variations and modifications can be effected within the spirit and scope of the invention.

I claim:

1. A method for placing data on x-ray sheet film carried in a cassette during x-ray exposure of the patient, comprising the steps of:

feeding said data electronically to display means on the exterior of the cassette, which display means exhibits and retains said data in human readable form visible from outside the cassette, after exposure of the patient, machine scanning said display means and converting the information therein by such machine to electric control signals, and by means of said control signals, imagewise exposing said film to said data in human readable form.

2. A method as set forth in claim 1, wherein said scanning and imagewise exposure of the film to said data takes place as part of a cassette unloading step.

3. A method as set forth in claim 2, wherein said unloading step includes the step of erasing said data from the cassette after said scanning step.

4. A method as set forth in claim 3, wherein said cassette has on its exterior, addressable means coupled to said display means to read data into said display means, said addressible means being addressed in said erasing step.

5. A method as set forth in claim 1, wherein said display means on the cassette comprises an LCD unit.

* * * * *